United States Patent
Lai et al.

(10) Patent No.: US 12,271,383 B2
(45) Date of Patent: Apr. 8, 2025

(54) METHOD AND APPARATUS FOR EXECUTING STRUCTURAL QUERY LANGUAGE INSTRUCTION IN SOLID-STATE STORAGE DEVICE

(71) Applicant: Silicon Motion, Inc., Zhubei (TW)

(72) Inventors: Bo-Cheng Lai, Kaohsiung (TW); Yen-Shi Kuo, Taoyuan (TW)

(73) Assignee: SILICON MOTION, INC., Zhubei (TW)

( * ) Notice: Subject to any disclaimer, the term of this patent is extended or adjusted under 35 U.S.C. 154(b) by 33 days.

(21) Appl. No.: 18/384,515

(22) Filed: Oct. 27, 2023

(65) Prior Publication Data

US 2024/0152516 A1    May 9, 2024

Related U.S. Application Data (60) Provisional application No. 63/422,053, filed on Nov. 3, 2022.

(30) Foreign Application Priority Data

May 31, 2023    (CN) .......................... 202310630567.6

(51) Int. Cl.
*G06F 16/2455*    (2019.01)
*G06F 12/02*    (2006.01)
*G06F 16/22*    (2019.01)

(52) U.S. Cl.
CPC ...... *G06F 16/2455* (2019.01); *G06F 12/0253* (2013.01); *G06F 16/2282* (2019.01)

(58) Field of Classification Search
CPC .......... G06F 16/24539; G06F 16/2282; G06F 16/24532; G06F 16/278
USPC .......................................................... 707/718
See application file for complete search history.

(56) References Cited

U.S. PATENT DOCUMENTS

| | | | |
|---|---|---|---|
| 2006/0218123 A1* | 9/2006 | Chowdhuri | ........ G06F 16/24532 |
| 2017/0109080 A1 | 4/2017 | Liu et al. | |
| 2020/0125559 A1* | 4/2020 | Talbot | ...................... G06F 16/26 |
| 2020/0334254 A1* | 10/2020 | Arye | ................... G06F 16/2393 |

(Continued)

FOREIGN PATENT DOCUMENTS

| | | |
|---|---|---|
| CN | 111061725 A | 4/2020 |
| CN | 112434002 A | 3/2021 |
| TW | 201717016 A | 5/2017 |

*Primary Examiner* — Hung T Vy (74) *Attorney, Agent, or Firm* — Birch, Stewart, Kolasch & Birch, LLP (57) ABSTRACT

The invention relates to a method and an apparatus for executing Structural Query Language (SQL) instructions in a Solid-state Storage Device (SSD). The apparatus includes: a processing unit; and a database accelerator. The processing unit is arranged operably to obtain an SQL query from a host side. The database accelerator is arranged operably to parse the SQL query according an SQL syntax tree to generate a series of table tasks to execute; and during the execution of the table tasks, read tables from a flash module through the processing unit, generate intermediate tables and sub-tables based on the read tables, and perform an arithmetic computation, a logical computation or both on a specific field in one intermediate table to generate a final dataset. The processing unit is arranged operably to reply to the host side with the final dataset.

20 Claims, 7 Drawing Sheets

(56) References Cited

U.S. PATENT DOCUMENTS

2021/0034598 A1\* 2/2021 Arye .................... G06F 16/288
2022/0121640 A1 4/2022 Zimmerman et al.

\* cited by examiner

METHOD AND APPARATUS FOR EXECUTING STRUCTURAL QUERY LANGUAGE INSTRUCTION IN SOLID-STATE STORAGE DEVICE

CROSS-REFERENCE TO RELATED APPLICATIONS

This application claims the benefit of priority to U.S. Provisional Application Ser. No. 63/422,053, filed on Nov. 3, 2022; Patent Application No. 202310630567.6, filed in China on May 31, 2023; the entirety of which is incorporated herein by reference for all purposes.

BACKGROUND

The disclosure generally relates to storage devices and, more particularly, to a method and an apparatus for executing Structural Query Language (SQL) instructions in a Solid-state Storage Device (SSD).

Multi-terabyte or petabyte datasets are now commonplace for analytic workloads of business intelligence. The data is typically stored in a relational database on a storage device, such as a hard drive, a solid-state storage device (SSD), etc., and analyzed by Structural Query Language (SQL) database software. Conventionally, to process an analytic query, the database software reads the input data on demand from the storage device, stores it to a dynamic random access memory (DRAM), and then uses powerful central processing units (CPUs) to compute with the data. Application servers initiate analytical queries, fetch data from the storage device and then compute it. It is desired to have faster query response.

SUMMARY

In an aspect of the invention, an embodiment introduces a method for executing Structural Query Language (SQL) instructions in a Solid-state Storage Device (SSD), performed within a flash controller, to include the following steps: obtaining an SQL query from a host side through a host I/F; parsing the SQL query according an SQL syntax tree to generate a series of table tasks to execute; reading a first table from the flash module and selecting a plurality of first records satisfying a first filtering condition from the first table to generate a first intermediate table; reading a second table from the flash module and selecting a plurality of second records satisfying a second filtering condition from the second table to generate a second intermediate table; splitting the second intermediate table into a plurality of second intermediate sub-tables on average; merging each first record comprising a specific value in the first intermediate table into each second record comprising the specific value in the plurality of second intermediate sub-tables parallelly to generate a third intermediate table; performing an arithmetic computation, a logical computation or both on a specific field in the third intermediate table to generate a calculation result, and storing the calculation result in a final dataset; and replying to the host side with the final dataset through the host I/F.

In another aspect of the invention, an embodiment introduces an apparatus for executing SQL instructions in a SSD, to include: a host interface (I/F), coupled to a host side; a flash I/F, coupled to a flash module; a random access memory (RAM); a processing unit, coupled to the host I/F, the flash I/F and the RAM; and a database accelerator, coupled to the processing unit. The processing unit is arranged operably to obtain an SQL query from the host side through the host I/F. The database accelerator is arranged operably to obtain the SQL query from the processing unit; parsing the SQL query according an SQL syntax tree to generate a series of table tasks to execute; read a first table from the flash module through the processing unit; select a plurality of first records satisfying a first filtering condition from the first table to generate a first intermediate table; read a second table from the flash module through the processing unit; select a plurality of second records satisfying a second filtering condition from the second table to generate a second intermediate table; split the second intermediate table into a plurality of second intermediate sub-tables on average; merge each first record comprising a specific value in the first intermediate table into each second record comprising the specific value in the plurality of second intermediate sub-tables parallelly to generate a third intermediate table; perform an arithmetic computation, a logical computation or both on a specific field in the third intermediate table to generate a calculation result; store the calculation result in a final dataset; and transmit the final dataset to the processing unit. The processing unit is arranged operably to reply to the host side with the final dataset through the host I/F.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
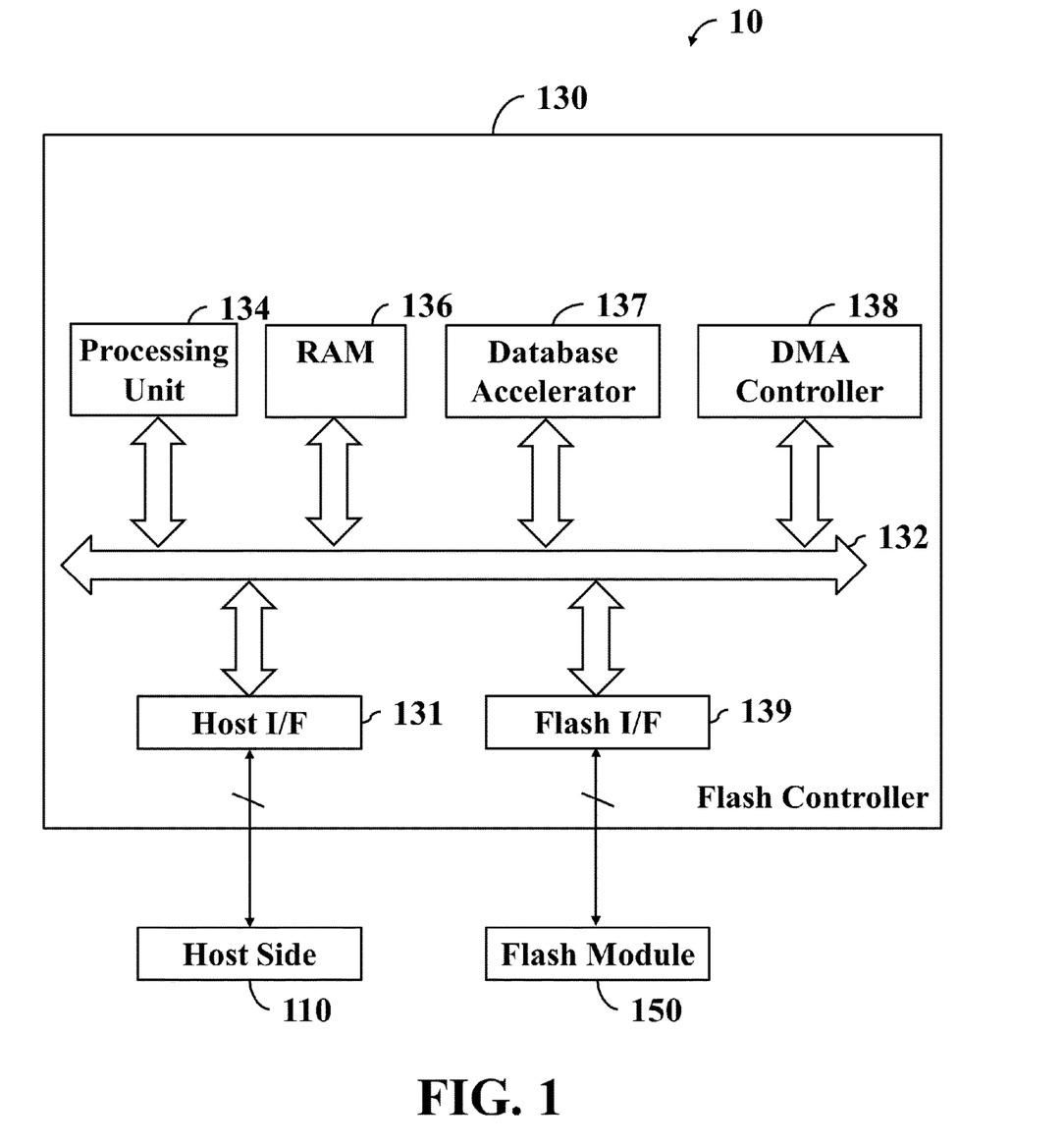
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, a smart television, a smart freezer, an automotive electronics system, or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host OF 131, such as read commands, write commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-to-flash (H2F) tables, flash-to-host (F2H) tables, queues, or others. The flash LT 139 includes a NAND flash controller (NFC) to provide functions that are required to access to the flash module 150, such as a command sequencer, a Low Density Parity Check (LDDC) encoder/decoder, etc.

The flash controller 130 may be equipped with the bus architecture 132 to couple components to each other to transmit data, addresses, control signals, etc. The components include but not limit to the host I/F 131, the processing unit 134, the RAM 136, the database accelerator 137, the direct memory access (DMA) controller 138 and the flash I/F 139. The DMA controller 138 moves data between the components through the bus architecture 132 according to the instructions issued by the database accelerator 137. For example, the DMA controller 138 may migrate data in a specific data buffer of the flash I/F 139 to a specific address of the RAM 136, migrate data in a specific address of the RAM 136 to a specific data buffer of the flash I/F 139, and so on.

The flash module 150 provides huge storage space typically in hundred Gigabytes (GB s), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
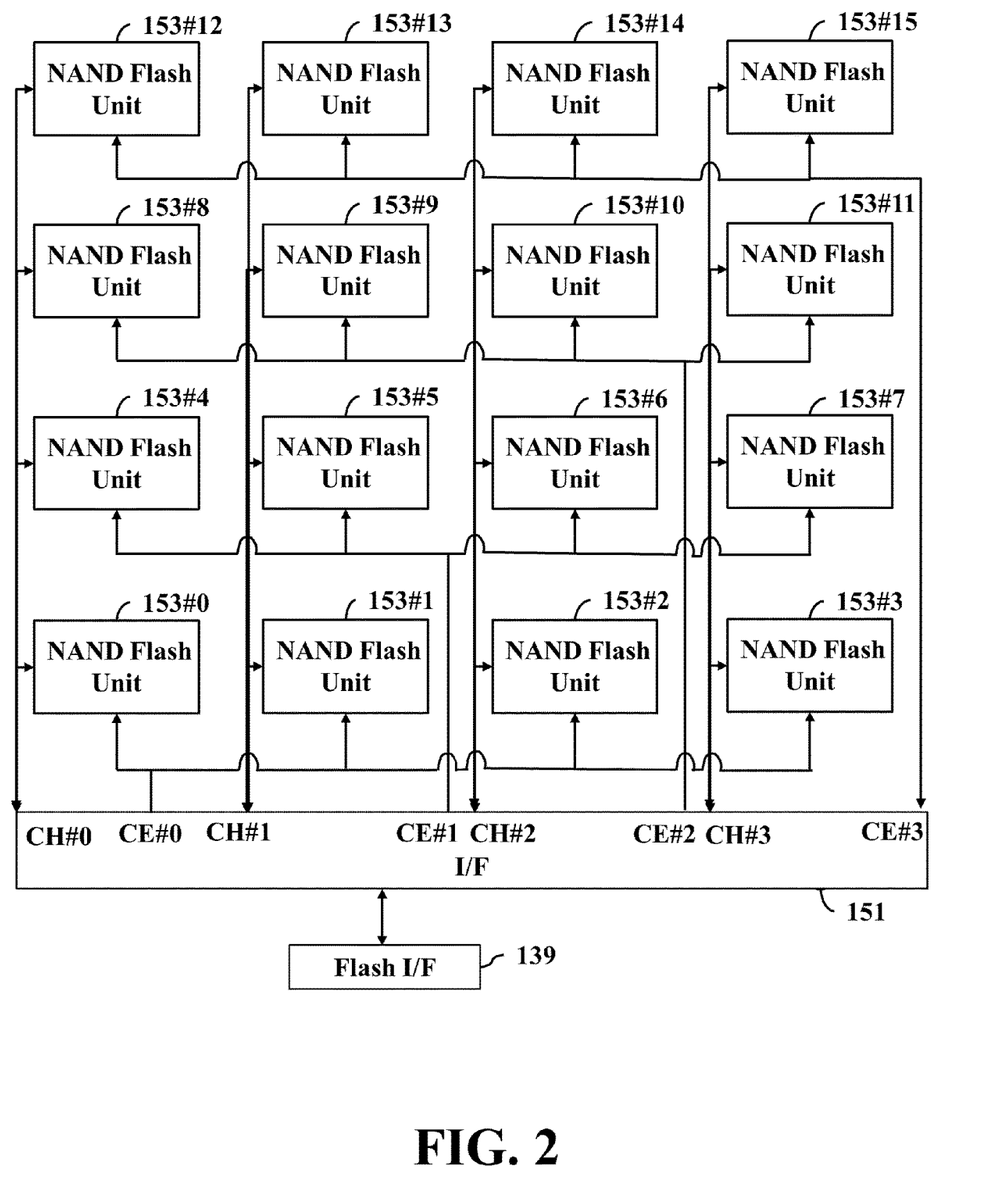
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash modules, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash modules 153 #0 to 153 #3, the NAND flash modules 153 #4 to 153 #7, the NAND flash modules 153 #8 to 153 #11, or the NAND flash modules 153 #12 to 153 #15, and read data from or program data into the activated NAND flash modules in parallel.

The analytics query of the SQL usually requires to generate numerous intermediate tables to speed up tasks such as filtering, calculation, sorting, merging, and so on. For example, the analytics query may be issued to obtain the trading volume of electronic stocks in the Taiwan stock market on Jan. 3, 2023 from the Taiwan stock trading database. Assume that this query requires to merge two tables: the stock basic-data table "stockProfile"; and the stock transaction table "stockTransactions". The stock basic-data table contains the fields <stockCode, stockName, indCategory> to store a stock code, a stock name and an industry category for each stock. The stock transaction table "stockTransactions" contains the fields <transID, transDate, stockCode, buyerAcc, sellerAcc, transQty> to store a transaction ID, a transaction date, a stock code, a buyer account, a seller account and a transaction quantity for each stock transaction. The exemplary SQL query for completing this analytics query is as follows:

SELECT sum(t2.transQty) as stockElectronicsQty
   FROM stockProfile as t1, stockTransactions as t2
   WHERE   t1.stockCode=t2.stockCode   AND
     t1.Industry='electronics' AND t2.transDate='2023-1-3'

Figure 3:
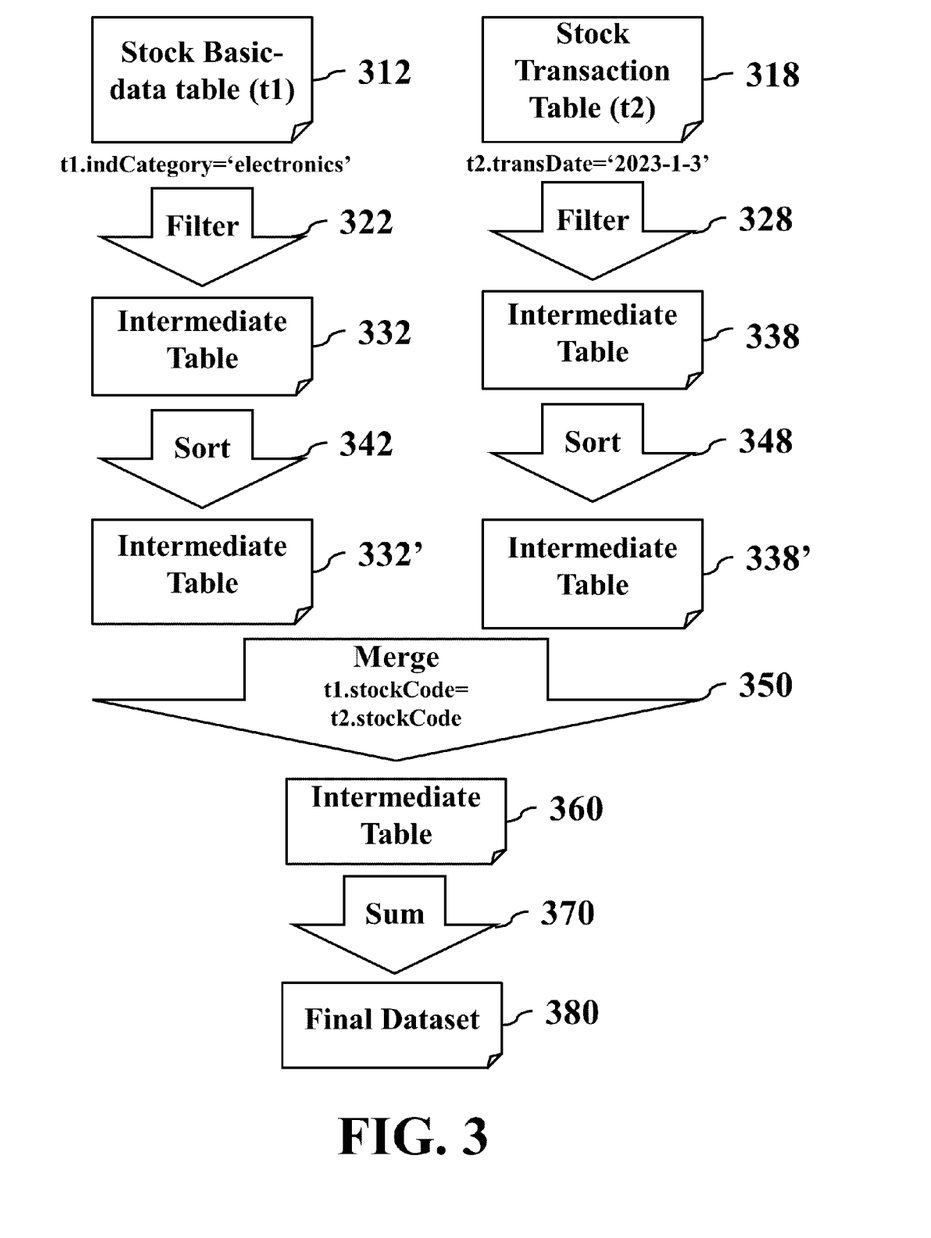
FIG. 3 is a schematic diagram showing the data flow for merging tables according to an embodiment of the invention.

Refer to FIG. 3 showing a schematic diagram of the data flow for the merging tables. In the filtering operation 322, the records whose industry category are the electronic industry "t1.indCategory='electronics'" are selected from the stock basic-data table 312 to generate the intermediate table 332, which may only contain the field "stockCode" to store the stock codes in the selected records. In the filtering operation 328, the records whose transaction date are Jan. 3, 2023 "t2.transDate='2023-1-3'" are selected from the stock transaction table 318 to generate the intermediate table 338, which may only contain the fields "transID", "stockCode" and "transQty" to store the transaction IDs, the stock codes and the transaction quantities in the selected records. The intermediate tables 332 and 338 are sorted by the stock codes "stockCode" through the sorting operations 342 and 348 to generate the sorted intermediate tables 332' and 338', respectively. Subsequently, the sorted intermediate tables 332' and 338' are undergone the merging operation 350 to generate the intermediate table 360, where the merged records in the intermediate table 360 all meet the condition "t1.stockCode==t2.stockCode" and may only contain the fields "transID" and "transQty" to store the transaction IDs and the transaction quantities. Subsequently, the summation operation 370 is performed to accumulate the all quantities in the intermediate table 360 to obtain the trading volume of electronic stocks in the Taiwan stock market on Jan. 3, 2023, and store the calculation result in the field "stockElectronicsQty" of a record of the final dataset 380.

Figure 4:
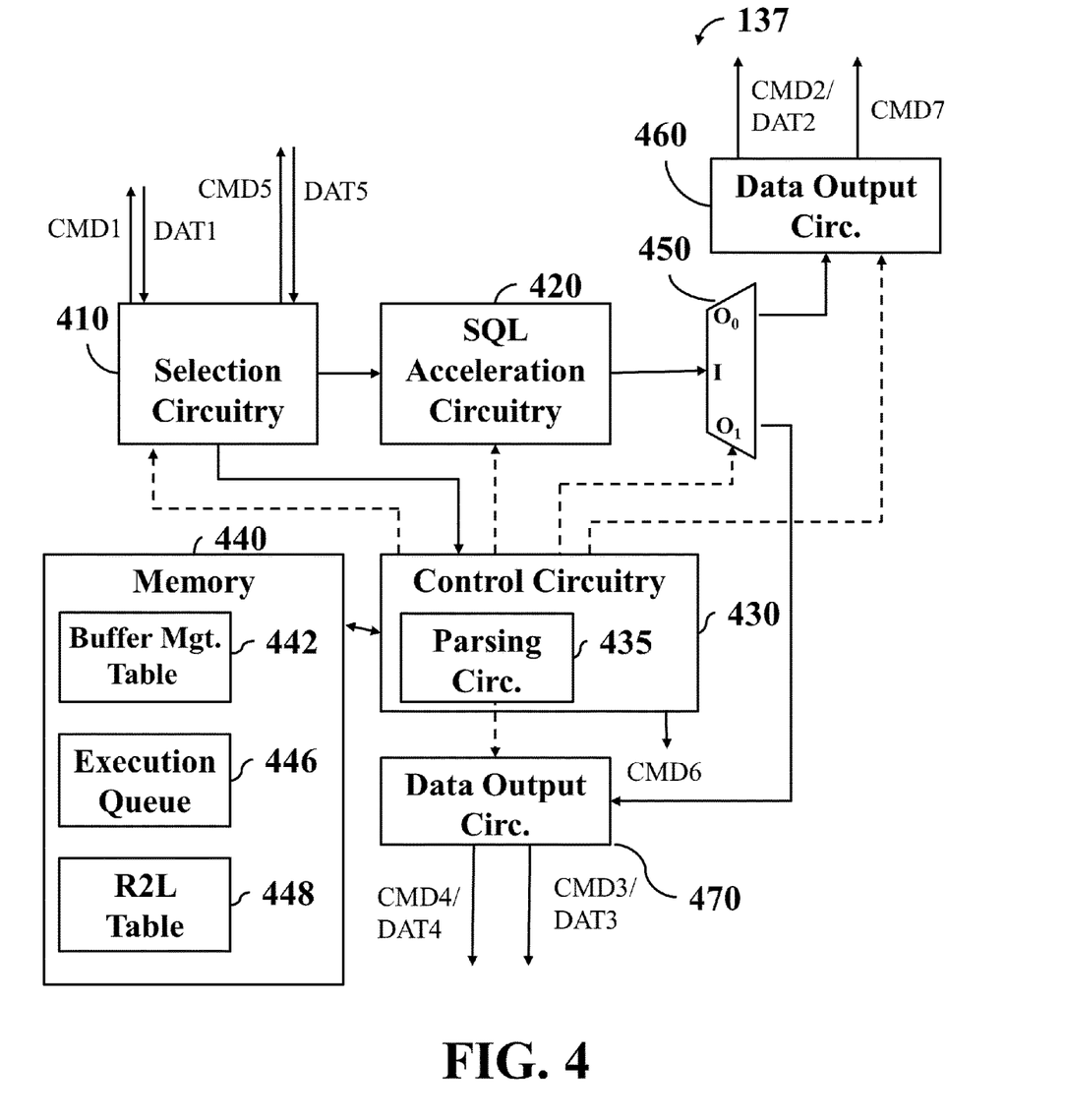
FIG. 4 is the block diagram of a database accelerator according to an embodiment of the invention.

The most computations required for the analytics query can be realized in the dedicated database accelerator 137 to reduce the computation workloads by the host side 110, so that the overall system performance is improved. Refer to FIG. 4 showing the block diagram of the database accelerator 137. The processing unit 134 when executing the database acceleration program module may use a proprietary communications protocol to perform a series of message and control signal interactions with the host side 110 through the host OF 131 to obtain SQL queries from the host side 110, and transmit the SQL queries to the database accelerator 137. The control circuitry 430 contains the parsing circuitry 435 to parse the SQL queries according to the SQL syntax tree and accordingly generate a series of table tasks. The table tasks include but not limited to: obtaining records that meet a specific condition from a specific table of a database to generate an intermediate table, in which each record contains one or more designated fields; dividing one intermediate table into multiple intermediate sub-tables; sorting an intermediate table/sub-table; performing a specific arithmetic calculation, a specific logical operations, or the combination thereof on one or more fields of an intermediate table/sub-table; merging intermediate tables and/or intermediate sub-tables according to a specific condition. Space in the memory 440 is allocated for the execution queue 446 to allow the control circuitry 430 to store the table tasks in the execution queue 446. Next, the control circuitry 430 obtains the table tasks from the execution queue 446 sequentially, and controls the selection circuitry 410, the SQL acceleration circuitry 420 the demultiplexer 450, the data output circuitries 460 and 470 accordingly to complete designated functions.

The flash module 150 may store the Record To Logical-block-address (R2L) table 448 and each record in the R2L table 448 stores an ID of a table, a range of record numbers (representing designated records) in this table, and a range of Logical Block Addresses (LBAs) corresponding to these records to indicate the information about which physical space mapped through the LBAs the designated records in a specific table (also referred to as raw table) are physically stored in. When the database accelerator 137 activates, the control circuitry 430 may issue the instruction to the selection circuitry 410 to start a database query operation for reading the R2L table 448 from the flash module 150. The selection circuitry 410 may issue a read command CMD1, which includes the LBAs for the R2L table 448, to the Firmware Translate Layer (FTL) executed by the processing unit 134. The FTL searches the Logical-To-Physical-address (L2P) table for the physical addresses corresponding to the LBAs, drives the flash I/F 139 to read the records stored in the physical addresses from the flash module 150, and drives the DMA controller 138 to store the R2L table 448 in the designated addresses of the RAM 136 allocated for these LBAs. The selection circuitry 410 reads the R2L table 448 from the designated addresses in the RAM 136 and stores the R2L table 448 in the memory 440.

The SQL acceleration circuitry 420 may include multiple Arithmetic Logic Units (ALUs) and the ALUs can be configured as a pipeline to perform an arithmetic computation, a logical computation or the both on one or more specific fields in the records, such as addition, subtraction, multiplication, division, equal, greater than, less than, or any combinations thereof. Each ALU can be configured to output a designated field of each record without performing any of the arithmetic and the logical computations. In order to perform the arithmetic and/or the logical computations on specific fields in the intermediate table or the intermediate sub-table, the control circuitry 430 may set registers in the SQL acceleration circuitry 420 to arrange the sequence and parameters of the arithmetic and/or the logical computations to complete a specific table task.

In order to obtain designated records that satisfy specific conditions from a designated table to generate an intermediate table, the control circuitry 430 may issue the instruction to the selection circuitry 410 to start a database query operation. The selection circuitry 410 may search for all LBAs of the designated table from the R2L table and issue multiple read commands CMD1 to the FTL executed by the processing unit 134, where each read command includes a portion of the found LBAs. The FTL searches the physical addresses mapped by the LBAs from the L2P table, drives the flash I/F 139 to read the records from the physical addresses of the flash module 150 and drives the DMA controller 138 to store the read records in designated addresses of the RAM 136 allocated for the LBAs. The selection circuitry 410 reads the records from the designated addresses of the RAM 136, removes the records that do not meet the filtering condition, and organizes the remaining records (that is, the content of intermediate table) into a data stream to output to the SQL acceleration circuitry 420.

The SQL acceleration circuitry 420 includes a stream sorting circuitry for receiving an original data stream and outputting a sorted data stream. The stream sorting circuitry includes an input buffer, an output buffer and a comparison logic for realizing a sorting algorithm known by those skilled in the art. In order to sort the records in the intermediate table or the intermediate sub-table in ascending or descending order, the control circuitry 430 may set registers in the SQL acceleration circuitry 420 for feeding the data stream corresponding to the intermediate table or the intermediate sub-table in the input buffer into the comparison logic. The comparison logic outputs the sorted data stream to the output buffer for storage. Each sorted intermediate table or sub-table may be further divided into multiple buckets and each bucket includes a portion of the records.

In order to complete the inner join of two intermediate tables, in some implementations, designated fields of all records in the two sorted intermediate tables are directly compared. Each record having values of the designated fields in one intermediate table (i.e. first intermediate table) is deleted if the values of the designated fields are not found in another intermediate table (i.e. second intermediate table). Each record having the values of the designated fields in the first intermediate table is merged with one or more records having the same values of the designated fields in the second intermediate table. The records in the second intermediate table that are not merged with any record in the first intermediate table are deleted. Thus, a merged intermediate table is generated.

Figure 7:
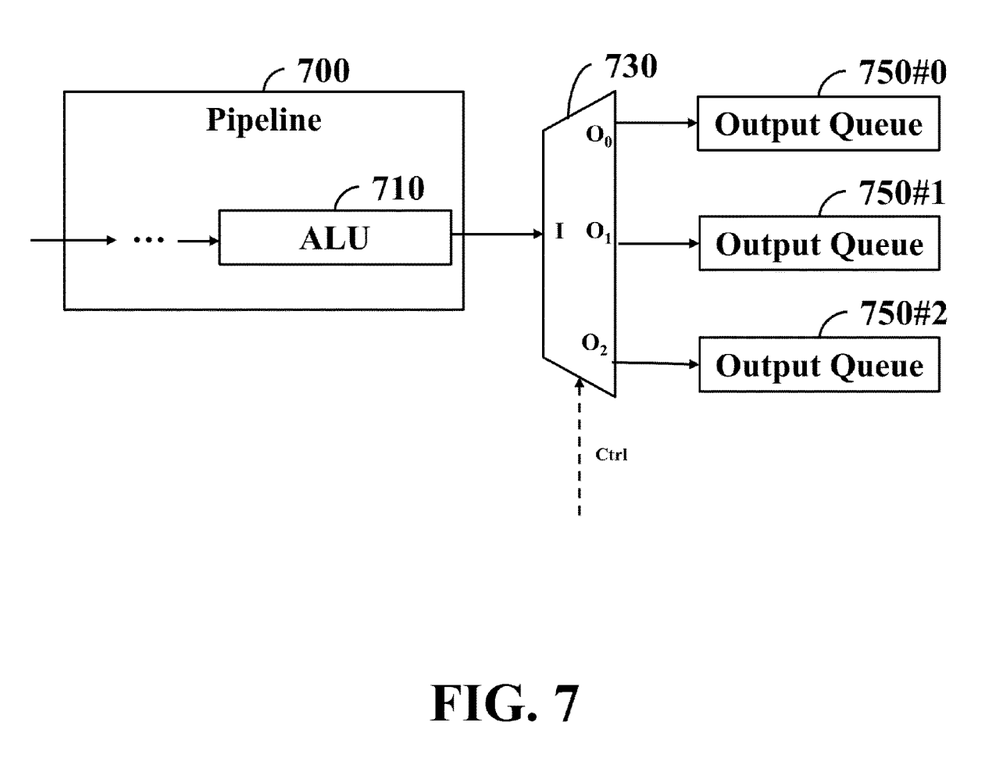
FIG. 7 is a schematic diagram illustrating a splitting of an intermediate table according to an embodiment of the invention.

In order to improve the inner join performance for the intermediate tables compared with the implementations as described above, among the two sorted intermediate tables, the intermediate table having more records is evenly split into two or more intermediate sub-tables. For the splitting of the intermediate tables into multiple intermediate sub-tables, the control circuitry 430 may configure the output of the last stage of the ALUs in the pipeline of the SQL acceleration circuitry 420 to multiple output queues in the round-robin manner. Refer to FIG. 7 showing a schematic diagram for splitting the intermediate table. The input terminal I of the demultiplexer 730 is coupled to the output terminal of the last stage of the ALU 710 in the pipeline 700. The three output terminals $O_0$, $O_1$ and $O_2$ of the demultiplexer 730 are coupled to the output queues 750 #0, 750 #1 and 750 #2, respectively, so that the records in the intermediate table are stored in the output queues 750 #0, 750 #1 and 750 #2 in the round-robin manner.

The SQL acceleration circuitry 420 includes multiple merging circuitries and each merging circuitry merges each record having matched values of the designated fields in the intermediate table into one record having the matched values of the designated fields in the corresponding intermediate sub-table to generate one merged record. Each merging circuitry deletes all unmatched records from the intermediate table and the corresponding intermediate sub-table. Thus, the merged intermediate table is generated. In order to combine the intermediate table and the intermediate sub-table according to a specific condition, the control circuitry 430 may set the registers in the SQL acceleration circuitry 420 to instruct each merging circuitry to complete the merging task for the intermediate table and the corresponding intermediate sub-table.

Since the storage volume of the RAM 136 in the flash controller 130 cannot satisfy the temporary storage requirements of the intermediate tables when the database accelerator 137 is running, in some implementations, part of the intermediate tables may be stored in the allocated space of the Dynamic Random Access Memory (DRAM) in the host side 110 through the host OF 131 and the allocated space may be referred to as the Host Memory Buffer (HMB). However, that would consumes excessive bandwidth of the host OF 131 during the data read and the data write of the HMB, resulting in the degraded performance of the executions of host data read, write, discard and/or erase commands by the flash controller 130. The host data read, write, discard and/or erase commands are the commands issued by the host side 110 to request the flash controller 130 for performing specific storage functions, for example, reading data of specific LBAs from the flash module 150, programming data of specific LBAs into the flash module 150, erasing data of a specific physical block in the flash module 150, and so on.

In order to solve the technical problems as described above, the database accelerator 137 programs part of the intermediate table or the intermediate sub-table into the flash module 150 through the flash I/F 139 to avoid occupying the resource of the host OF 131. For example, the control circuitry 430 may issue an instruction to the data output circuitry 470 for storing one or more buckets of records in the intermediate sub-table into pre-allocated space in the RAM 136 and programming the other buckets of records in this intermediate sub-table into the flash module 150.

The following examples are given to illustrate the operation of the internal components of the database accelerator 137: To complete the example as shown in FIG. 3, the parsing circuitry 435 of the control circuitry 430 parses the corresponding SQL query according to the SQL syntax tree to generate a series of table tasks and performs the table tasks sequentially.

First, the control circuitry 430 may issue two instructions to the selection circuitry 410 for: selecting the records whose industry categories are electronics from the stock basic-data table 312; and selecting the records whose transaction dates are Jan. 3, 2023 from the stock transaction table 318. The two instructions may be expressed as Instr1:"stockProfile", "indCategory='electronics'" and Instr2:"stockTransactions","indCategory='transDate='2023-1-3'", in which the first parameter carries the table name and the second parameter carries the filtering condition. The selection circuitry 410 searches the R2L table for all LBAs of the stock basic-data table 312 and the stock transaction table 318. Next, the selection circuitry 410 issues multiple read commands CMD1 carrying these LBAs to the FTL executed by the processing unit 134.

The FTL searches the L2P table for the physical addresses mapped by the LBAs in each read command CMD1, drives the flash I/F 139 to read the records from the physical addresses of the flash module 150 and drives the DMA controller 138 to store the records in the designated addresses of the RAM 136 allocated for these LBAs. The selection circuitry 410 reads the records of the two tables 312 and 318 from the designated addresses of the RAM 136, removes the records dissatisfying the filtering condition from the stock basic-data table 312 to generate the intermediate table 332 and removes the records dissatisfying the filtering condition from the stock transaction table 318 to generate the intermediate table 338. The selection circuitry 410 organizes each intermediate table into a data stream and outputs the data streams to the SQL acceleration circuitry 420.

The control circuitry 430 may set the registers in the SQL acceleration circuitry 420 to configure the SQL acceleration circuitry 420 that allows the data stream of the intermediate table 332 to pass through the stream sorting circuitry, which performs the ascending sorting operation 342 with the field "stockCode" to generate the sorted intermediate table 332'. The control circuitry 430 controls the demultiplexer 450 to couple the input terminal I to the output terminal $O_1$ and issues the instruction to the data output circuitry 470 for storing the intermediate sub-table 332' in the allocated space of the RAM 136.

Since the records of the intermediate table 338 are huge, for speeding up the following merging operation among the intermediate tables, the control circuitry 430 may set the registers of the SQL acceleration circuitry 420 and control the demultiplexer 730 to arrange that the intermediate table 338 output from the last stag of the ALU 710 in the pipeline 700 to the output queues 750 #0 to 750 #2 in the round-robin manner. For example, the intermediate table 338 having 600,000 records is split into three intermediate sub-tables 338a, 338b and 338c on average, so that each intermediate sub-table has 200,000 records. Next, the control circuitry 430 may set the registers in the SQL acceleration circuitry 420 to configure the SQL acceleration circuitry 420 that allows the data streams of the intermediate sub-table 338a, 338b and 338c to pass through the stream sorting circuitry, which performs the ascending sorting operation 348 with the field "stockCode" to generate the sorted intermediate sub-tables 338g, 338h and 338i (may be referred to as intermediate sub-table 338' collectively). The control circuitry 430 may configure the SQL acceleration circuitry 420 to issue a control signal to the demultiplexer 450 for feeding the sorted intermediate sub-tables 338g, 338h and 338i to the data output circuitry 470 through the output terminal O1 of the demultiplexer 450. Assume that each record of the intermediate sub-table 338g, 338h and 338i includes the transaction ID "transID" in two bytes, the stock code "stockCode" in one byte and the quantity "transQty" in one byte, and each bucket stores 128K of data (i.e. the 32,768 records): The records of each of the intermediate sub-tables 338g, 338h and 338i are divided into 7 buckets.

The memory 440 stores the buffer management table 442. The buffer management table 442 stores relevant information about physical storage locations for the intermediate tables and/or the intermediate sub-tables. The buffer management table 442 contains multiple records and each record corresponding to one intermediate table or sub-table includes the fields: <PID,nB,RAM_start,RAM_len,LBA_start,LBA_len>, where PID represents the ID of the intermediate table or sub-table, nB represents the total number of buckets, RAM_start represents the start address in the RAM 136, RAM_len represents the length stored in the RAM 136, LBA_start represents the start LBA number for this intermediate table or sub-table stored in the flash module 150, and LBA_len represents the LBA quantity for this intermediate table or sub-table stored in the flash module 150.

Figure 6:
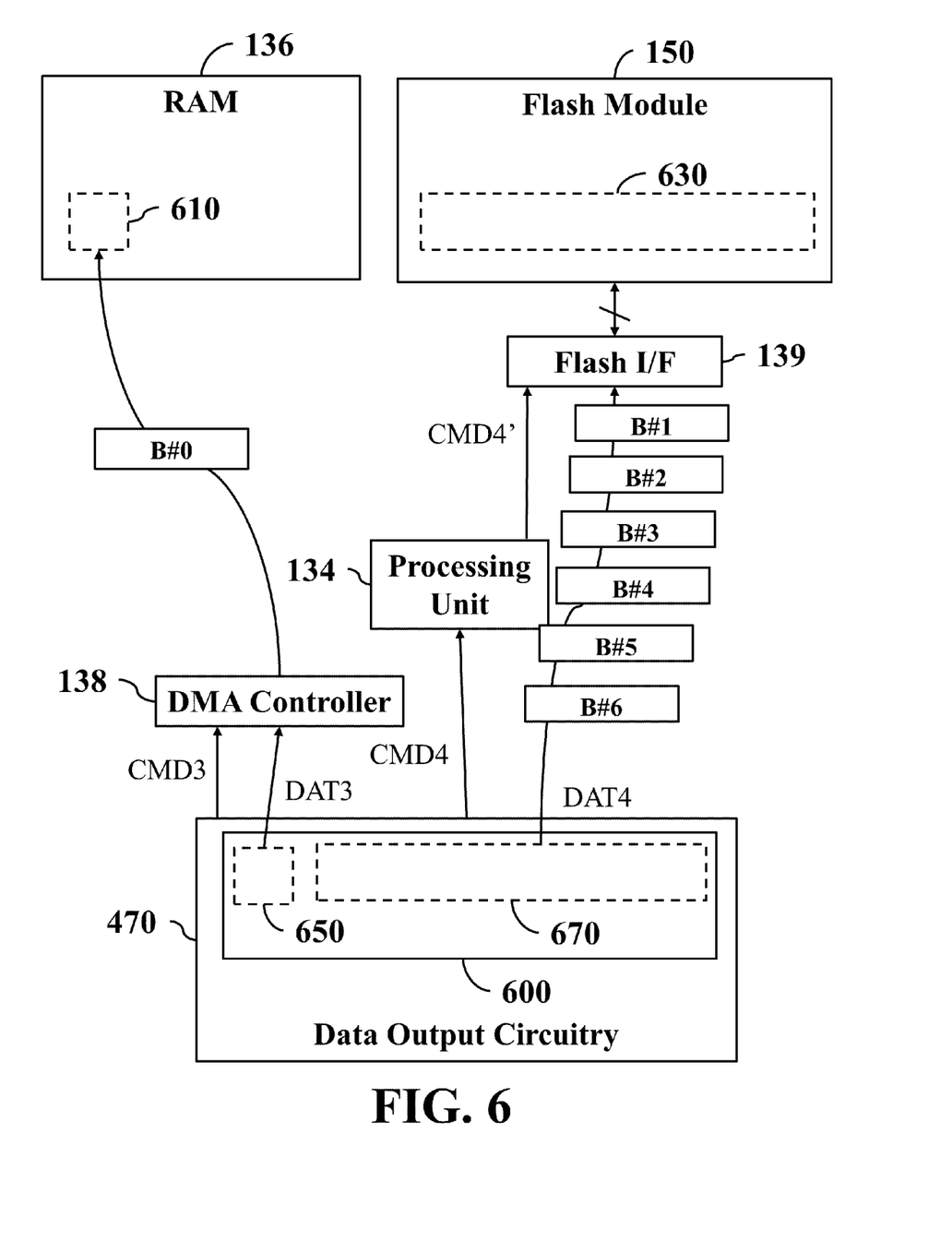
FIG. 6 is a schematic diagram illustrating a temporary storage of an intermediate sub-table according to an embodiment of the invention.

Refer to FIG. 6 showing the temporary storage example of the intermediate sub-table 338g. The control circuitry 430 issues an instruction to the data output circuitry 470 for storing the records of the bucket B #0 of the intermediate sub-table 338g in the allocated space 610 in the RAM 136 and programing the records of the buckets B #1 to B #6 of the intermediate sub-table 338g into the flash module 150. The data output circuitry 470 issues the command CMD3 to the DMA controller 138 to instruct the DMA controller 138 to read the records DAT3 of the bucket B #0 from the space 610 at the designated address of the RAM 136. In order to program the records of the intermediate sub-table 338g into the flash module 150, the flash controller 130 reserves an LBA range that is not used by the host side 110 for the database accelerator 137, such as LBA #EFFF0000-LBA #EFFFFFFF. The control circuitry 430 assigns the LBAs to the records of the buckets B #1 to B #6. Assume that one LBA indicates 512 bytes of data: One LBA may cover the successive 128 records in the intermediate sub-table 338g and the records of one bucket may be covered by 256 LBAs. For example, the logical addresses of the bucket B #1 are LBA #0xEFFF0000-LBA #0xEFFF00FF, the logical addresses of the bucket B #2 are LBA #0xEFFF0100-LBA #0xEFFF01FF, the logical addresses of the bucket B #3 are LBA #0xEFFF0200-LBA #0xEFFF02FF, and so on. The data output circuitry 470 issues multiple write commands CMD4 to the FTL executed by the processing unit 134. Each write command CMD4 includes the LBA range of the designated bucket, and the designated address of the space 670 in the data buffer 600 for storing the records of this bucket. The FTL may issue the write command CMD4' to drive the flash I/F 139 to read data of the LBA range from the designated address of the data buffer 600 and program the data into the space 630 in the flash module 150. After the records have been programmed, the FTL updates the L2P table to add information about which physical addresses the data of the LBAs are physically stored in the flash module 150. Next, the control circuitry 430 appends a record <"0", "7","0x70000","0x30000","0xEFFF0000","0x61B"> to the buffer management table 442.

The control circuitry 430 provides an address of the space 610 storing the sorted intermediate table 332' to the selection circuitry 410 and the selection circuitry 410 issues a data migration command CMD5 to the DMA controller 138 to drive the DMA controller 138 to move the data DATS (i.e. the intermediate table 332') stored in the address of the RAM 136 to the data buffer in the selection circuitry 410. Additionally, the control circuitry 430 issues another data migration command CMD5 to the DMA controller 138 through the selection circuitry 410 to drive the DMA controller 138 to move the data DATS (i.e. the bucket B #0 of the intermediate table 338') stored in the address of the space 610 of the RAM 136 to the data buffer in the selection circuitry 410. The control circuitry 430 sets the registers in the SQL acceleration circuitry 420 to configure the merging circuitry for merging each record having a specific stock code "stockCode" into the intermediate table 332' to the records having the matched stock code "stockCode" in the bucket B #0 of the intermediate table 338' to become merged records, and deleting all unmatched records from the bucket B #0 of the intermediate table 338' to generate the intermediate table 360.

Figure 5:
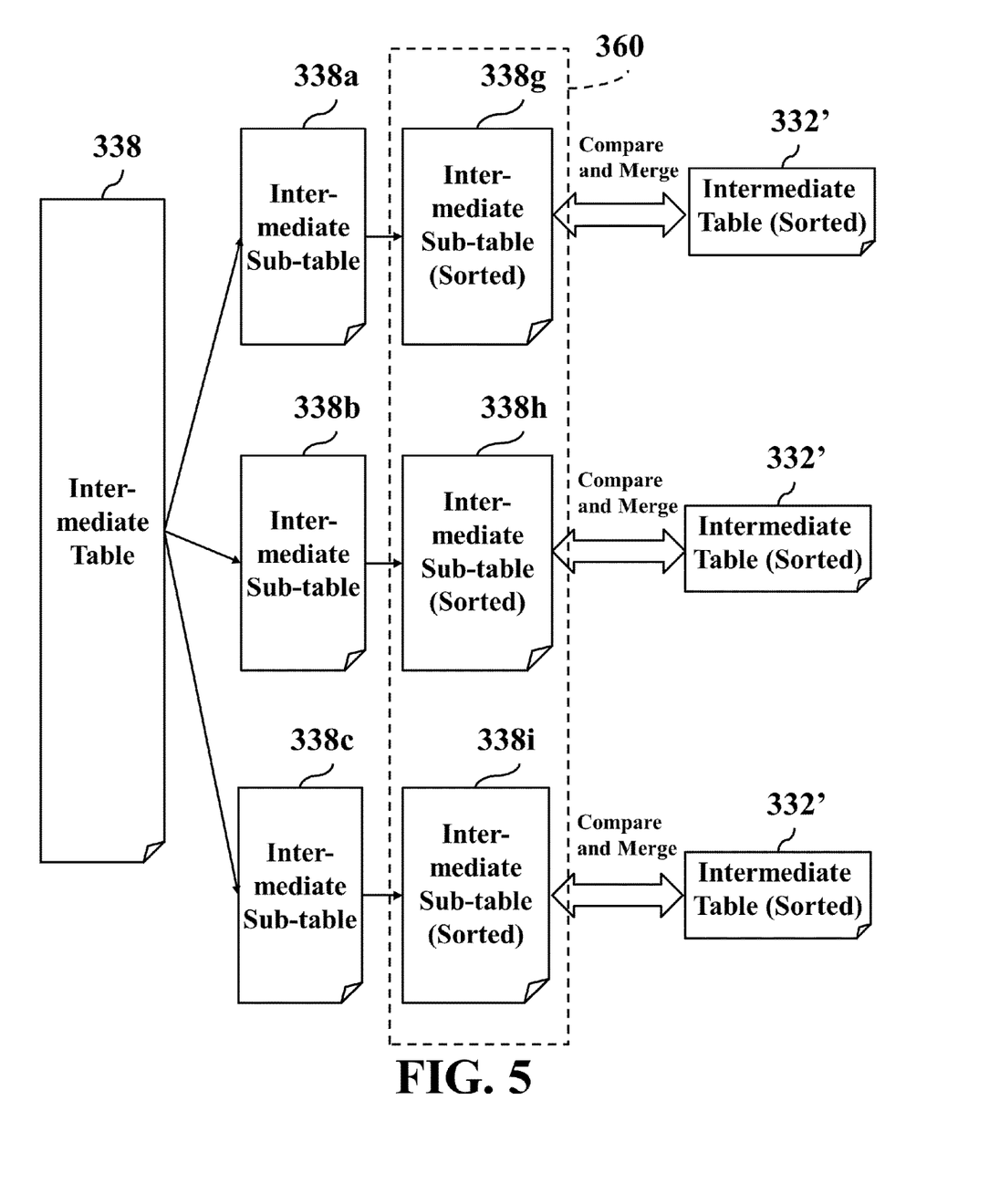
FIG. 5 is a schematic diagram showing a division of an intermediate table and a parallel comparison-and-merging of divided intermediate sub-tables according to an embodiment of the invention.

Subsequently, the control circuitry 430 issues multiple instructions to the selection circuitry 410 according to the record having PID="0" in the buffer management table 442, so that the selection circuitry 410 issues multiple read commands CMD1 to the FTL executed by the processing unit 134, where each read command CMD1 carries the LBA range of one of the buckets B #1 to B #6 of the intermediate table 338'. For each read command CMD1, the FTL searches the L2P table for the physical addresses mapped by the LBAs, drives the flash I/F 139 to read the records from the physical addresses of the flash module 150 and drives the DMA controller 138 to store the records in the designated address of the RAM 136 allocated for the LBAs. The selection circuitry 410 reads the records from the designated address of the RAM 136, organizes the records into a data stream and outputs the data stream to the SQL acceleration circuitry 420. For any of the buckets B #1 to B #6 of the intermediate table 338', the control circuitry 430 sets the registers in the SQL acceleration circuitry 420 to configure the merging circuitry for merging each record having a specific stock code "stockCode" in the intermediate table 332' into the records having the matched stock code "stockCode" in this bucket of the intermediate table 338' to become merged records, and deleting all unmatched records from this bucket of the intermediate table 338' to generate the intermediate table 360. For example, the record having the stock code "stockCode=2330" in the intermediate table 332' is merged into each record having the stock code "stockCode=2330" in the corresponding bucket of the intermediate table 338'. The merging for the other stocks whose industry category is electronics is deduced by analogy. For example, all records having the stock code "stockCode=1102" are removed from the corresponding bucket of the intermediate table 338'. The deletion for the other stocks whose industry category is not electronics is deduced by analogy. Refer to FIG. 5. The merging described above includes merging each record of the intermediate table 332' into the corresponding matched records in the intermediate sub-table 338g, merging each record of the intermediate table 332' into the corresponding matched records in the intermediate sub-table 338h, and merging each record of the intermediate table 332' into the corresponding matched records in the intermediate sub-table 338i, parallelly. The merged intermediate sub-tables 338g, 338h and 338i are collected to form the intermediate table 360.

During the merging, when the control circuitry 430 receives the message indicating that the records of the bucket B #0 of the intermediate table 360 have been collected completely from the merging circuitry, the control circuitry 430 issues the instruction to the data output circuitry 470 for storing the records of the bucket B #0 of the intermediate table 360 in the allocated space of the RAM 136. When the control circuitry 430 receives the message indicating that the records of the bucket B #1 or any subsequent bucket of the intermediate table 360 have been collected completely from the merging circuitry, or when the control circuitry 430 receives the message indicating that the records of the intermediate table 360 have been generated completely from the merging circuitry, the control circuitry 430 assigns a range of reserved LBAs to the records of the bucket B #1 or any subsequent bucket and issues the instruction carrying the assigned LBA range to the data output circuitry 470, so that the records of the bucket B #1 or any subsequent bucket of the intermediate table 360 to be programmed into the flash module 150. The data output circuitry 470 issues write commands CMD4 to the FTL executed by the processing unit 134 and each write command CMD4 includes the LBA range for a designated bucket of the intermediate table 360 and an address of the data buffer 600 for storing the records of this bucket of the intermediate table 360. The FTL issues the write command CMD4' to drive the flash I/F 139 for reading data of a designated LBA range from the data buffer 600 and programming the data into designated space in the flash module 150. After the data programming, the FTL updates the L2P table to add information about which physical addresses that data of this LBA range is physically stored in. Additionally, the control circuitry 430 appends one record having PID="1" to the buffer management table 442.

Since the intermediate table 338' is unnecessary to be used after the generation of the intermediate table 360, the control circuitry 430 issues the discard command CMD6 to the FTL executed by the processing unit 134 for discarding the data of the LBA range "0xEFFF0000-0xEFFF061B". Subsequently, the FTL deletes the physical address information mapped by the LBA range "0xEFFF0000-0xEFFF061B" from the L2P table, so that the physical space corresponding to the LBA range "0xEFFF0000-0xEFFF061B" can be recycled by the garbage collection (GC) process.

The control circuitry 430 provides the address of the RAM 136 for storing the merged intermediate table 340 to the selection circuitry 410 and the selection circuitry 410 issues the data migration command CMD5 to the DMA controller 138 for driving the DMA controller 138 to move the data DAT5 stored in this address of the RAM 136 (i.e. the intermediate table 360) to the data buffer of the selection circuitry 410. Subsequently, the control circuitry 430 issues instructions to the selection circuitry 410 according to the records having PID="1" in the buffer management table 442, which enable the selection circuitry 410 to issue read commands CMD1 to the FTL executed by the processing unit 134, where each read command CMD1 carries the LBA range of the bucket B #1 or any subsequent bucket of the intermediate table 360. For each read command CMD1, the FTL searches the L2P table for the physical addresses mapped by these LBAs, drives the flash I/F 139 to read the records from these physical addresses of the flash module 150 and drives the DMA controller 138 to store the records in the designated address of the RAM 136 allocated for these LBAs. The selection circuitry 410 reads the records from the designated address of the RAM 136 and organizes the records into a data stream to output to the SQL acceleration circuitry 420. The control circuitry 430 sets the registers in the SQL acceleration circuitry 420 to arrange the ALUs to sum up the transaction quantities "transQty" in all records of the intermediate table 360 and store the summation of the transaction quantities in the electronics-stock transaction quantity field "stockElectronicsQty" of one record of the final dataset 380. The control circuitry 430 controls the demultiplexer 450 to couple the input terminal I to the output terminal $O_0$ and issues the instruction to the data output circuitry 460 for transmitting the final dataset 380 to the database acceleration program module executed by the processing unit 134. The data output circuitry 460 issues the command CMD2 to the DMA controller 138 to instruct the DMA controller 138 to read the data DAT2 (i.e. the final dataset 380) from the designated address of the data buffer in the data output circuitry 460 and store the data DAT2 in the designated address of the RAM 136. The data output circuitry 460 issues the command CMD7 to the database acceleration program module executed by the processing unit 134 to instruct the database acceleration program module to reply to the host side 110 with the final dataset 380. The database acceleration program module reads the final dataset 380 from the designated address of the RAM 136 and uses the proprietary communications protocol to perform a series of message and control signal interactions with the host side 110 through the host OF 131 for replying to the host side 110 with the final dataset 380.

Since the intermediate table 360 is no longer be used after the summation of the electronics-stock quantities is obtained, the control circuitry 430 issues the discard command CMD6 to the FTL executed by the processing unit 134 for discarding the data of the LBA range assigned to the intermediate table 360. Subsequently, the FTL deletes the physical address information mapped by the LBA range assigned to the intermediate table 360 from the L2P table, so that the physical space corresponding to the LBA range can be recycled by the GC process.

Those skilled in the art may realize the selection 410 and the SQL acceleration circuitry 420 with a well-known technology, such as the in-storage Analytic Query Offloading MAchiNe (AQUOMAN).

Although the embodiment has been described as having specific elements in FIGS. 1-2, 4 and 7, it should be noted that additional elements may be included to achieve better performance without departing from the spirit of the invention. Each element of FIGS. 1-2, 4 and 7 is composed of various circuits and arranged to operably perform the aforementioned operations.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for executing Structural Query Language (SQL) instructions in a Solid-state Storage Device (SSD), performed within a flash controller coupled to a host side through a host interface (I/F) thereof, and a flash module through a flash I/F thereof, comprising:
obtaining an SQL query from a host side through a host I/F;
parsing the SQL query according an SQL syntax tree to generate a series of table tasks to execute;
reading a first table from the flash module and selecting a plurality of first records satisfying a first filtering condition from the first table to generate a first intermediate table;
reading a second table from the flash module and selecting a plurality of second records satisfying a second filtering condition from the second table to generate a second intermediate table;
splitting the second intermediate table into a plurality of second intermediate sub-tables on average;
merging each first record comprising a specific value in the first intermediate table into each second record comprising the specific value in the plurality of second intermediate sub-tables parallelly to generate a third intermediate table;
performing an arithmetic computation, a logical computation or both on a specific field in the third intermediate table to generate a calculation result, and storing the calculation result in a final dataset; and
replying to the host side with the final dataset through the host I/F.

2. The method of claim 1, wherein the second intermediate table having more records than the first intermediate table.

3. The method of claim 1, wherein each second intermediate sub-table comprises a first bucket and a plurality of second buckets, the method comprising:
storing records of the first bucket in each second intermediate sub-table in a random access memory (RAM) of the flash controller;
assigning a logical block address (LBA) range to each second bucket in each second intermediate sub-table;
driving the flash I/F to program each second bucket in each second intermediate sub-table into the flash module; and
updating a Logical-To-Physical-address (L2P) table for each second bucket in each second intermediate sub-table to record information about which physical addresses that data of a corresponding LBA range are physically stored in.

4. The method of claim 3, comprising:
deleting physical address information mapped by all LBA ranges associated with the second buckets in the second intermediate sub-tables from the L2P table after the third intermediate table is generated, thereby enabling physical space corresponding to the LBA ranges in the flash module to be recycled in a garbage collection process.

5. The method of claim 1, comprising:
sorting all first records in the first intermediate table and all second records in each second intermediate sub-tables before merging.

6. The method of claim 1, comprising:
searching a record to logical-block-address (R2L) table for a first logical block address (LBA) range associated with the first table and a second LBA range associated with the second table;
issuing a first read command carrying the first LBA range to the flash I/F for obtaining the first table from the flash module; and
issuing a second read command carrying the second LBA range to the flash I/F for obtaining the second table from the flash module.

7. The method of claim 1, wherein the host OF is arranged operably to communicate with the host side by Universal Serial Bus (USB), Advanced Technology Attachment (ATA), Serial Advanced Technology Attachment (SATA), Peripheral Component Interconnect Express (PCI-E), Universal Flash Storage (UFS) or Embedded Multi-Media Card (eMMC) protocol.

8. The method of claim 1, wherein a proprietary communications protocol is used to obtain the SQL query from the host side and reply to the host side with the final dataset.

9. The method of claim 1, wherein the flash I/F is arranged operably to communicate with the flash module by Open NAND Flash Interface (ONFI) or DDR Toggle protocol.

10. The method of claim 1, wherein the flash controller reserves a logical block address (LBA) range that is not used by the host side for the second intermediate sub-tables.

11. An apparatus for executing Structural Query Language (SQL) instructions in a Solid-state Storage Device (SSD), comprising:
a host interface (I/F), coupled to a host side;
a flash I/F, coupled to a flash module;
a random access memory (RAM);
a processing unit, coupled to the host I/F, the flash I/F and the RAM; and
a database accelerator, coupled to the processing unit,
wherein the processing unit is arranged operably to obtain an SQL query from the host side through the host I/F,
wherein the database accelerator is arranged operably to obtain the SQL query from the processing unit; parsing the SQL query according an SQL syntax tree to generate a series of table tasks to execute; read a first table from the flash module through the processing unit; select a plurality of first records satisfying a first filtering condition from the first table to generate a first intermediate table; read a second table from the flash module through the processing unit; select a plurality of second records satisfying a second filtering condition from the second table to generate a second intermediate table; split the second intermediate table into a plurality of second intermediate sub-tables on average; merge each first record comprising a specific value in the first intermediate table into each second record comprising the specific value in the plurality of second intermediate sub-tables parallelly to generate a third intermediate table; perform an arithmetic computation, a logical computation or both on a specific field in the third intermediate table to generate a calculation result; store the calculation result in a final dataset; and transmit the final dataset to the processing unit,
wherein the processing unit is arranged operably to reply to the host side with the final dataset through the host I/F.

12. The apparatus of claim 11, wherein the second intermediate table having more records than the first intermediate table.

13. The apparatus of claim 11,
wherein each second intermediate sub-table comprises a first bucket and a plurality of second buckets,
wherein the database accelerator is arranged operably to store records of the first bucket in each second intermediate sub-table in the RAM; and assign a logical block address (LBA) range to each second bucket in each second intermediate sub-table,
wherein the processing unit is arranged operably to drive the flash I/F to program each second bucket in each second intermediate sub-table into the flash module; and update a Logical-To-Physical-address (L2P) table for each second bucket in each second intermediate sub-table to record information about which physical addresses that data of a corresponding LBA range are physically stored in.

14. The apparatus of claim 13, wherein the processing unit is arranged operably to delete physical address information mapped by all LBA ranges associated with the second buckets in the second intermediate sub-tables from the L2P table after the third intermediate table is generated, thereby enabling physical space corresponding to the LBA ranges in the flash module to be recycled in a garbage collection process.

15. The apparatus of claim 11, wherein the database accelerator is arranged operably to sort all first records in the first intermediate table and all second records in each second intermediate sub-tables before merging.

16. The apparatus of claim 11, wherein the database accelerator is arranged operably to search a record to logical-block-address (R2L) table for a first logical block address (LBA) range associated with the first table and a second LBA range associated with the second table; issue a first read command carrying the first LBA range to the flash I/F for obtaining the first table from the flash module; and issue a second read command carrying the second LBA range to the flash I/F for obtaining the second table from the flash module.

17. The apparatus of claim 11, wherein the host OF is arranged operably to communicate with the host side by Universal Serial Bus (USB), Advanced Technology Attachment (ATA), Serial Advanced Technology Attachment (SATA), Peripheral Component Interconnect Express (PCI-E), Universal Flash Storage (UFS) or Embedded Multi-Media Card (eMMC) protocol.

18. The apparatus of claim 11, wherein the processing unit is arranged operably to use a proprietary communications protocol to obtain the SQL query from the host side and reply to the host side with the final dataset.

19. The apparatus of claim 11, wherein the flash I/F is arranged operably to communicate with the flash module by Open NAND Flash Interface (ONFI) or DDR Toggle protocol.

20. The apparatus of claim 11, wherein the database accelerator is arranged operably to reserve a logical block address (LBA) range that is not used by the host side for the second intermediate sub-tables.

\* \* \* \* \*